(12) United States Patent
Lee et al.

(10) Patent No.: US 7,686,955 B2
(45) Date of Patent: Mar. 30, 2010

(54) SUBMERGED HOLLOW FIBER MEMBRANE MODULE

(75) Inventors: Moo Seok Lee, Seoul (KR); Kwang Jin Lee, Suwon-si (KR); Yong Cheol Shin, Seoul (KR); Seong Hak Choi, Suwon-si (KR); Youn Tai Woo, Seoul (KR)

(73) Assignee: Kolon Industries, Inc., Kwacheon-Si (KR)

( * ) Notice: Subject to any disclaimer, the term of this patent is extended or adjusted under 35 U.S.C. 154(b) by 552 days.

(21) Appl. No.: 10/579,194

(22) PCT Filed: Feb. 5, 2004

(86) PCT No.: PCT/KR2004/000216

§ 371 (c)(1),
(2), (4) Date: May 12, 2006

(87) PCT Pub. No.: WO2005/046848

PCT Pub. Date: May 26, 2005

(65) Prior Publication Data

US 2007/0125697 A1    Jun. 7, 2007

(30) Foreign Application Priority Data

Nov. 17, 2003    (KR) ...................... 10-2003-0081027

(51) Int. Cl.
*B01D 63/02* (2006.01)
*B01D 61/00* (2006.01)

(52) U.S. Cl. ............................. 210/321.69; 210/321.88; 210/321.89; 210/650

(58) Field of Classification Search ........................ None
See application file for complete search history.

(56) References Cited

U.S. PATENT DOCUMENTS 3,984,328 A * 10/1976 Brun et al. ............. 210/321.87

(Continued)

FOREIGN PATENT DOCUMENTS

JP      5123543 A     5/1993

(Continued)

*Primary Examiner*—Krishnan S Menon
(74) *Attorney, Agent, or Firm*—Birch, Stewart, Kolasch & Birch, LLP

(57) ABSTRACT

The present invention discloses a submerged hollow fiber membrane module which is of such a structure that it is easy to expand a module processing capability according to a treatment capacity, provides convenient module coupling properties and module manufacturing properties, maintains a stable flux under an efficient air diffusion condition and prevents the damage of membranes and water leakage caused by the loosening of module connecting regions. The submerged hollow fiber membrane module comprises [I] two module headers (2 and 2') having a filtrate water collecting portion (3) for collecting filtrate water filtered through hollow fiber membranes and a filtrate water outlet (7), [II] an air diffusion unit 8 consisting of support tubes (9 and 9') fixing the two module headers (2 and 2') while keeping them spaced a predetermined distance and air diffusion tubes (11 and 11') having air diffusion holes (13), and [III] a bundle of hollow fiber membranes (1) having both opposite ends fixed to the insides of the module headers (2 and 2') by an adhesive (6) so as to form a water collecting space within the module headers (2 and 2'), the ends (5) of the hollow portions of the hollow fiber (20) membranes being opened and disposed in parallel to a filtrate water discharge surface (4).

14 Claims, 3 Drawing Sheets

U.S. PATENT DOCUMENTS

| | | | | |
|---|---|---|---|---|
| 4,061,821 A | * | 12/1977 | Hayano et al. | 428/37 |
| 4,876,006 A | * | 10/1989 | Ohkubo et al. | 210/321.69 |
| 5,248,424 A | | 9/1993 | Cote et al. | |
| 5,783,083 A | * | 7/1998 | Henshaw et al. | 210/636 |
| 5,783,983 A | | 7/1998 | Ureshino et al. | |
| 5,944,997 A | | 8/1999 | Pedersen et al. | |
| 6,328,886 B1 | * | 12/2001 | Miyashita et al. | 210/220 |
| RE39,294 E | * | 9/2006 | Mahendran et al. | 210/321.69 |
| 2002/0139748 A1 | * | 10/2002 | Cote et al. | 210/636 |
| 2002/0153299 A1 | | 10/2002 | Mahendran et al. | |

FOREIGN PATENT DOCUMENTS

| | | |
|---|---|---|
| JP | 05285349 A | 11/1993 |
| JP | 07275665 A | 10/1995 |

* cited by examiner

SUBMERGED HOLLOW FIBER MEMBRANE MODULE

BACKGROUND OF THE INVENTION

1. Field of the Invention

The present invention relates to a separation membrane module suitable for the field of treatment of water, such as waste water, sewage water, drinking water, etc., and more particularly, to a submerged hollow fiber membrane module which is easy to expand the processing capability of the module according to a processing capacity, suitable for the treatment of a large amount of water because the installation area is small, capable of preventing foulants by an effective air diffusion.

A polymer separation membrane is being distributed to a wide variety of fields including the field of existing applications along with the development of its technology, especially, its demand is being increased in the field of water treatment along with the importance of the environment. A hollow fiber type membrane is generally such a module whose membrane is protected by a cylindrical case since it has an advantage in water treatment because of its high throughout per installation area while its mechanical strength is low due to the characteristics of a porous membrane structure. In the module of such type, in case of waste water treatment, as generally known, it is hard to remove foulants accumulated on surfaces of a membrane, and the permeability is lowered due to fouling.

2. Description of the Related Art

In order to solve such a problem, submerged modules with no case had been devised. However, in a case that the strength of a membrane is not high enough, there may bring out the degradation of system reliability due to membrane damage. In this case, if air diffusion is not efficiently achieved, a fouling problem still occurs to thus increase the operation pressure and lower the flux.

In order to minimize the loss of permeability of the submerged module, foulants accumulated on membranes have to be removed by air diffusion. At this time, a strong air diffusion condition is required, thus there is a possibility that hollow fiber membranes are damaged.

Korean Registered Patent No. 22807 proposes a module fixed by developing a hollow fiber membrane in a conical form and folding it in a U shape in order to prevent the pollution of the membrane under a mild air diffusion condition. In this case, however, the volume of the module becomes larger and it is not easy to couple between modules for increasing a processing capacity from a structural viewpoint.

A submerged module disclosed in Korean Registered Patent No. 236921 is characterized in that a hollow fiber membrane is not fold in a U shape but air injection port and a filtrate water outlet are connected to one portion of the module with both ends of the hollow fiber membrane being fixed in a I shape. Such module structure is inefficient to the arrangement of a water collecting pipe and an air injecting pipe in coupling a plurality of modules for increasing a processing capacity, and the filtrate water outlet and the air injection port coexist on one portion of the module, to thus decrease workability in the manufacture of a module.

Especially, in case of a module used for the treatment of a large amount of water, a rectangular shape in which a bundle of hollow fiber membranes is widely spread is more convenient for collecting a number of modules in a small installation area than a cylindrical shape. The module of such a shape has a merit that it is capable of producing a large amount of treated water on a small installation area, while there is a big possibility that foulants would be accumulated because a bundle of hollow fiber membranes are densely concentrated, thus an efficient air diffusion process has to be accompanied. In this procedure, due to a direct impact applied to membranes, there may be occurred the degradation of quality of treated water by the damage of membranes and a water leakage caused by the loosening of joint portions between module parts when the membranes are used for a long time. Further, in a case that a number of modules are coupled according to a treatment capacity when adapted to a large-scale water treatment, an efficient arrangement is impossible and thus it is difficult to minimize the installation area and it is not easy to couple them.

SUMMARY OF THE INVENTION

The present invention is designed to solve the problems of the prior art, and therefore the present invention to provide a submerged hollow fiber membrane module which is of such a structure that it is easy to expand a module processing capacity according to a treatment volume, connecting regions of module parts are minimized to thus prevent water leakage due to the loosening of connecting regions when used for a long time, and the workability can be improved in the manufacture of the module.

Furthermore, the present invention provides a submerged hollow fiber membrane module which is of such a structure capable of vibrating hollow fiber membranes as air is generated on three sides through an air diffusion unit mounted on the module itself so that an effective air diffusion is enabled in order to prevent a reduction in flow rate and an increase in pressure caused by the accumulation of foulants.

Furthermore, the present invention provides a submerged hollow fiber membrane module which is of such a structure that air diffusion tubes for air diffusion also serve as support tubes for supporting the module for the purpose of simplification of a module structure.

The present invention to provides connecting means which is capable of expanding the processing capacity of the module easily without an increase of projected installation area by coupling hollow fiber membrane module units.

Accordingly, it is an object of the present invention to provide a submerged module which exhibits a high flow rate at a small installation area, provides convenient module coupling properties and module manufacturing properties, maintains a stable flux under an efficient air diffusion condition and prevents the damage of membranes and water leakage caused by the loosening of module connecting regions.

To achieve the above object, there is provided a submerged hollow fiber membrane module according to the present invention, comprising: [I] two module headers having a filtrate water collecting portion for collecting filtrate water filtered through hollow fiber membranes and a filtrate water outlet; [II] an air diffusion unit consisting of support tubes fixing the two module headers while keeping them spaced a predetermined distance and air diffusion tubes having air diffusion holes; and [III] a bundle of hollow fiber membranes having both opposite ends fixed to the insides of the module headers by an adhesive so as to form a water collecting space within the module headers, the ends of the hollow portions of the hollow fiber membranes being opened and disposed in parallel to a filtrate water discharge surface.

BRIEF DESCRIPTION OF THE DRAWINGS

Other objects and aspects of the present invention will become apparent from the following description of embodiments with reference to the accompanying drawings in which.

DESCRIPTION OF THE PREFERRED EMBODIMENT

Figure 1:
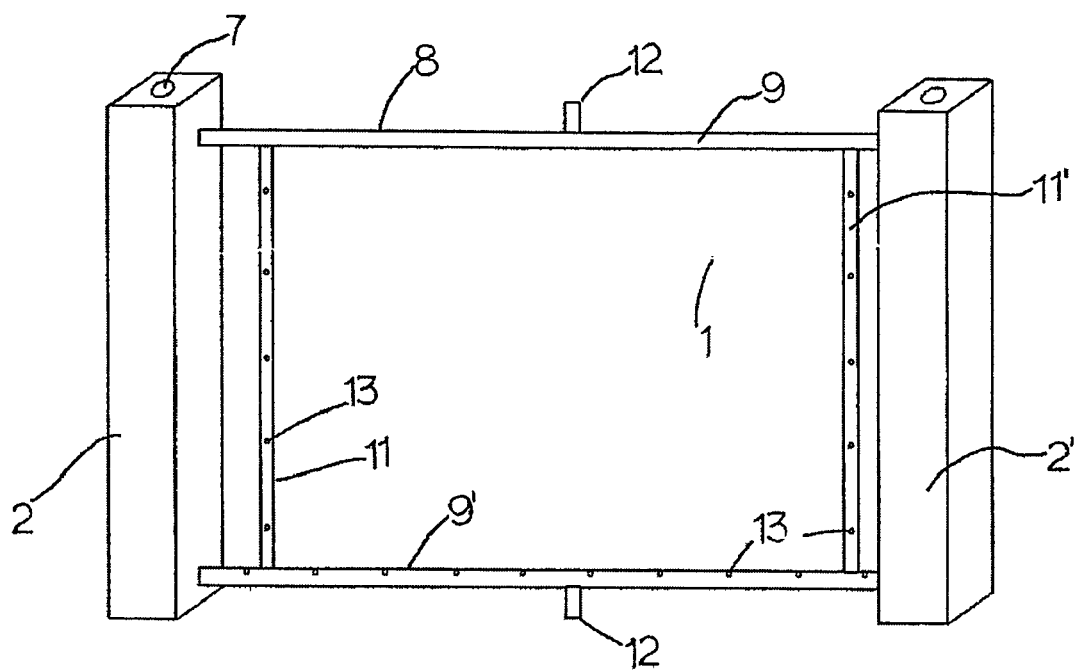
FIG. 1 is a schematic perspective view of a submerged hollow fiber membrane module according to the present invention.

Hereinafter, a preferred embodiment of the present invention will be described in more detail referring to the drawings.

Figure 2:
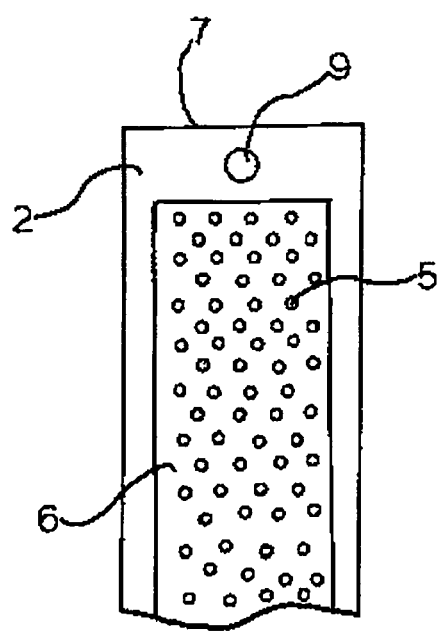
FIG. 2 is a cross sectional view showing a module header of FIG. 1 cut out vertically to a longitudinal direction of the hollow fiber membrane.
Figure 3:
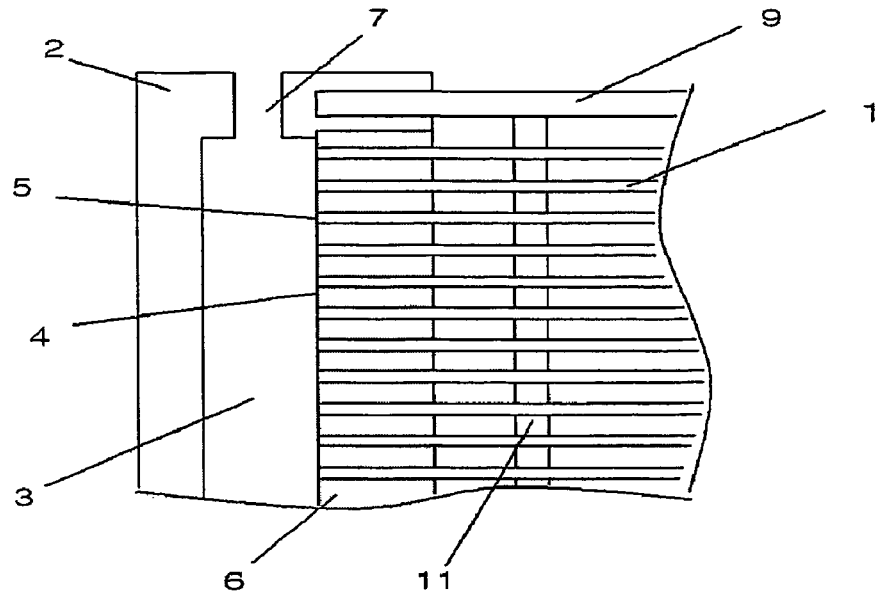
FIG. 3 is a cross sectional view showing a module header of FIG. 1 cut out horizontally to a longitudinal direction of the hollow fiber membrane.

FIG. 1 is a schematic perspective view of a submerged hollow fiber membrane module according to the present invention. FIG. 2 is a cross sectional view showing a module header 2 of FIG. 1 cut out vertically to a longitudinal direction of the hollow fiber membrane. FIG. 3 is a cross sectional view showing a module header 2 of FIG. 1 cut out horizontally to a longitudinal direction of the hollow fiber membrane.

In FIG. 1, only one string of a hollow fiber membrane 1 is illustrated for convenience.

In the present invention, as shown in FIG. 1, a submerged hollow fiber membrane module comprises: [I] two module headers 2 and 2' having a filtrate water collecting portion 3 and a filtrate water outlet 7; [II] an air diffusion unit 8 consisting of two support tubes 9 and 9' being transversely connected to the module headers 2 and 2' and fixing and supporting them and two air diffusion tubes 11 and 11' vertically connected to the support tubes 9 and 9' and located in a bundle of hollow fiber membranes; and [III] a bundle of hollow fiber membranes 1 fixed to the insides of the module headers by an adhesive 6.

The module headers 2 and 2' consisting of the filtrate water collecting portion 3 and the filtrate water outlet 7 can prevent water leakage caused by the loosening of connecting regions between module parts because the connecting regions are omitted by minimizing the number of module parts, and exhibits the effect of reducing cost because it is easy to manufacture modules.

Meanwhile, the air diffusion unit 8 consisting of the upper support tube 9, the lower support tube 9' and the two air diffusion tubes 11 and 11' carry out both the diffusion function and the function of a supporting element for fixing the two module headers 2 and 2' while maintaining a predetermined distance between them, thereby distributing to the simplification of a module structure.

The upper support tube 9 has both opposite end portions vertically connected to the upper end portions of the module headers 2 and 2', respectively, and provided with an air injection port 12 on the central portion thereof.

Meanwhile, the lower support tube 9 has both opposite end portions vertically connected to the lower end portions of the module headers 2 and 2', respectively, and provided with air injection port 12 on the central portion thereof, and a plurality of air diffusion holes 13 along a longitudinal direction.

Meanwhile, the air diffusion tubes 11 and 11' are vertically connected to the upper support tube 9 and the lower support tube 9' to be located in the bundle of hollow fiber membranes, and a plurality of air diffusion holes 13 along a longitudinal direction.

Meanwhile, the hollow fiber membrane 1 is fixed to the insides of the module headers by an adhesive 6 so that both opposite ends are provided with a water collecting space inside the module headers 2 and 2', and the ends 5 of the hollow fiber portions of the hollow fiber membrane are opened and disposed in parallel to a filtrate water discharge surface 4.

Additionally, the air diffusion unit 8 and the module headers 2 and 2' are provided with respective connecting members optionally mounted for serially coupling two or more submerged hollow fiber membrane modules according to the present invention.

Preferably, the connecting members are provided with a path for flowing filtrate water and air between the two module headers and the air diffusion tubes both serially coupled to each other.

Preferably, the distance between the module header 2 and the air diffusion tube 11 or the distance between the module header 2' and the air diffusion tube 11' is 1 to 20 cm.

In other words, the distance between the module headers 2 and 2' and the air diffusion tubes 11 and 11' arranged adjacent thereto is preferably 1 to 20 cm.

Further, the diameter of the air diffusion holes 13 formed on the two air diffusion tubes 11 and 11' and on the lower support tube 9' is preferably 2 to 8 mm.

In this way, the present invention provides the air diffusion holes existing on the two air tubes 11 and 11' and the lower support tube 9', thus enabling to vibrate the hollow fiber membranes on three sides by air.

Air used for air diffusion is introduced through the air injection port 12 to generate relatively large bubbles through the air diffusion holes 13, thereby causing to physically clean the membranes. Especially, air is generated through the diffusion holes located at the air diffusion tubes 11 and 11' in the vertical direction 20 cm or less distant from the module headers 2 and 2' where hollow fiber membranes are densely concentrated and the accumulation of foulants is concentrated. At the same time, as air is generated from the lower support tube 9' on the lower part of the module to raise bubbles, the membranes are vibrated, thereby preventing fouling. The amount of bubbles air-diffused due to a pressure difference caused by a water head becomes different according to the disposition of the air diffusion holes. Thus, it is preferable to compensate the difference by increasing the diameter of the air diffusion holes disposed on the lower part of the module.

Especially, such air diffusion unit is not an independent apparatus, but also serves as a module support tube, thereby enabling the simplification of a module structure. Further, bubbles are generated from three sides around the lower part of the module and the module header portions at the left and right, thereby enabling efficient air diffusion.

The module provided by the present invention comprises a bundle of hollow fiber membranes 1 having a separation membrane function, and filtered water permeated from the outside of the membranes by a suction pressure or a natural pressure caused by a water head is collected at the water collecting portion 3 of the module headers 2 and 2' at both sides through the insides of the membranes. At this time, on the filtrate water discharge surface 4 inside the module header, as shown in FIG. 3, the ends 5 of the hollow portions of the hollow fiber membranes are opened in parallel to the filtrate discharge surface 4 while being fixed thereto by an adhesive 6, thus it is possible to collect the filtrate water in the water collecting portion 3 through the filtrate water discharge surface 4. The filtrate water collected on the water collecting portion 3 is discharged through the filtrate water outlet 7 of the module header 2 connected to a filtrate water spouting apparatus such as a suction pump, etc. At this time, the filtrate water outlets 7 of the module headers 2 and 2' can exist on the upper and lower surface, respectively, in consideration of expandability by the coupling of module units. In this structure, in order to carry out operation by one module unit, each individual outlet may be connected to the filtrate water spouting apparatus, or the filtrate water outlet on the lower end surface of the header is closed by using a closed connecting member and only the filtrate water outlet on the upper end surface is made useable by connection. The length of the hollow fiber membranes 1, that is, the distance between the module headers 2 and 2', is preferably 80 to 200 cm. As seen from above, the two headers 2 and 2' perform water collecting function symmetrically, thereby compensating a pressure drop dependent upon the length of the hollow fiber membranes 1.

The water has to be permeated only through micro pores existing on the outer surface of the hollow fiber membranes during a filtration process. However, in a case that water leaks through a gap between the module parts or the like, the filtration function is degraded. In the module provided by the present invention, the module headers 2 and 2' are configured as a single part, and combined with the hollow fiber membranes 1 only by the adhesive 6. Thus, in comparison with the assembling of a plurality of parts, the manufacturing cost of the module can be lowered and water leakage caused by the loosening of connecting regions between parts can be prevented.

At this time, the shape of the module headers 2 and 2' can be selected from a group consisting of a cylindrical shape or a rectangular shape.

Meanwhile, the treatment of wastewater containing suspended solids of a high concentration may bring out a reduction of flow rate or a pressure increase due to the accumulation of foulants, and thus a filtration process is accompanied by an air diffusion process by using air. The module provided by the present invention does not require a separate air diffusion apparatus since the module itself is provided with an air diffusion function, and the air diffusion unit 8 of the module also serves as a support tube of the module headers 2 and 2', thereby enabling the simplification of the module structure. That is, the air diffusion unit 8 of the module includes upper and lower support tubes 9 and 9' in a transverse direction vertically connected to the headers 2 and 2', respectively, so as to fix the module headers 2 and 2' and two air diffusion tubes 11 and 11' in a vertical direction vertically connected to the upper and lower support tubes 9 and 9', respectively, and disposed in a bundle of hollow fiber membranes. At this time, the air injection port 12 is disposed on the center of the upper and lower support tubes 9 and 9', to thus be connected to an air supply device. At this time, the air injection port 12 can exist on the upper and lower support tubes, respectively, in consideration of expandability by the coupling of module units. In this structure, in order to carry out operation by one module unit, each individual air injection port 12 may be connected to an air supply device, or the air injection port of the lower support tube 9' is closed by using a closed connecting member and only the air injection port of the upper support tube 9 is made useable by connection.

For an efficient air diffusion process, the air diffusion holes 13 are preferably disposed on the lower support tube 9' of the air diffusion unit 8 among the support tubes of the transverse direction. Additionally, the hollow fiber bundles near the module headers 2 and 2' are very densely concentrated around as compared to the central part of the module and have a relatively small clearance, thus the accumulation of foulants are concentrated on that portion. Therefore, in order to maximize the efficiency of air diffusion, it is preferable that another air diffusion tubes 11 and 11' in a vertical direction are disposed around the module headers 2 and 2', that is, on the point 1 to 20 cm distant from the module headers 2 and 2'.

In a case that such a module having the air diffusion function is immersed into a raw water desired to be actually treated, as the depth of water becomes larger, that is, as it goes toward a lower part of the module, the flow rate of air from air diffusion holes 13 is reduced due to a pressure difference by the water head. Taking this into consideration, the diameters of air diffusion holes 13 disposed on the two air diffusion tubes 11 and 11' of a vertical direction are preferably increased by 10 to 100% as compared to the holes disposed right above as they go toward a lower part of the module. The diameter of the diffusion holes 13 of the lower support tube 9' connecting the lower part of the module is preferably 1.5 to 2.0 times the diameter of smallest air diffusion holes of the air diffusion tubes 11 and 11' of the transverse direction, and the air diffusion holes 13 are preferably have a diameter of 2 to 8 mm.

Figure 4:
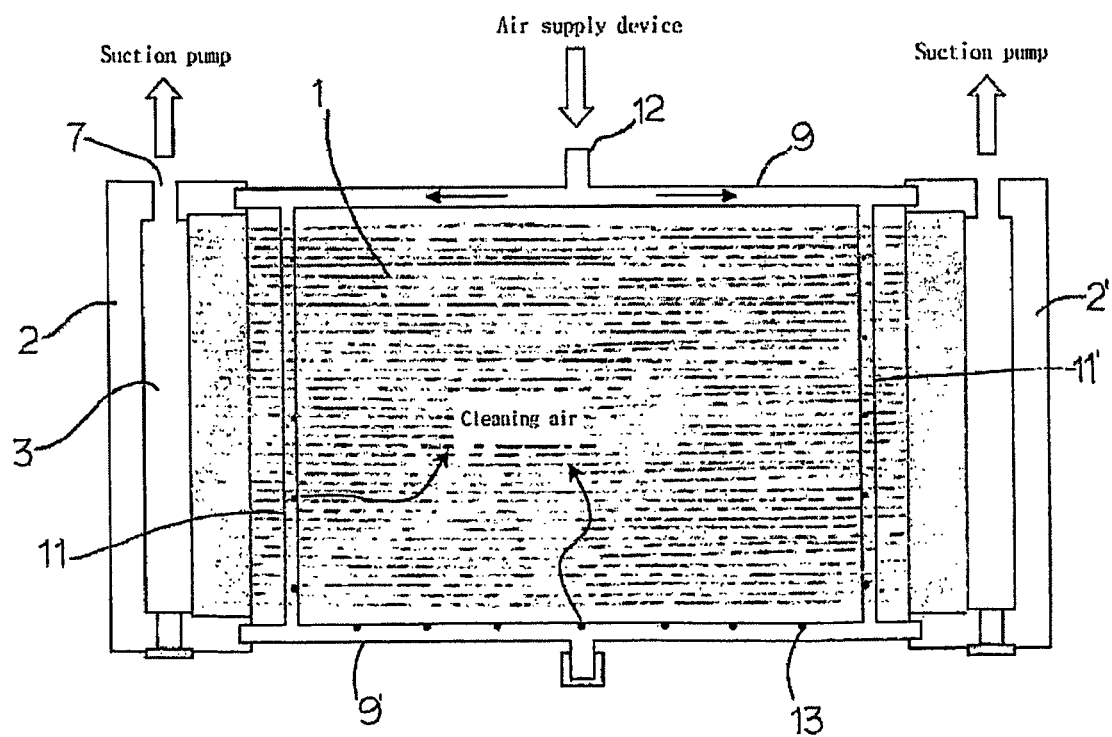
FIG. 4 is a schematic view showing an air diffusion of the submerged hollow fiber membrane module according to the present invention.

In case of bringing about air diffusion by the above-described method, as bubbles generated from the air diffusion holes 13 of the lower part of the module rise to an upper part, they continually vibrate the hollow fiber membranes 1 in transverse disposition and prevent the accumulation of foulants. The bubbles generated from the air diffusion tubes 11 and 11' of a vertical direction at the left and right prevent the accumulation foulants on the portion where the membranes are concentrated. FIG. 4 is a schematic view showing an air diffusion of a submerged hollow fiber membrane module according to the present invention.

The above-stated submerged hollow fiber membrane module is designed in such a manner that bubbles are generated on three sides in order to prevent the degradation of module performance due to the pollution of the membranes to directly vibrate the hollow fiber membranes and thus prevent the accumulation of foulants. Therefore, when the module is operated for a long time with strong air diffusion, there is a possibility that the membranes may be damaged. For this reason, it is preferable to use a high strength hollow fiber membrane having a tensile strength greater than 1 kg/strand. More preferably, a composite hollow fiber membrane having a tensile strength greater than 10 kg/strand as being reinforced by braid is used.

In a case that the submerged module is adapted to a large scale water treatment process, it is advantageous to obtain a high flow rate to be treated at a small mounting area. For this, the module according to the present invention is capable of using a single unit module according to a treatment capacity as well as increasing a processing capacity as two or more unit modules are combined without an increase in projected installation area.

Figure 5:
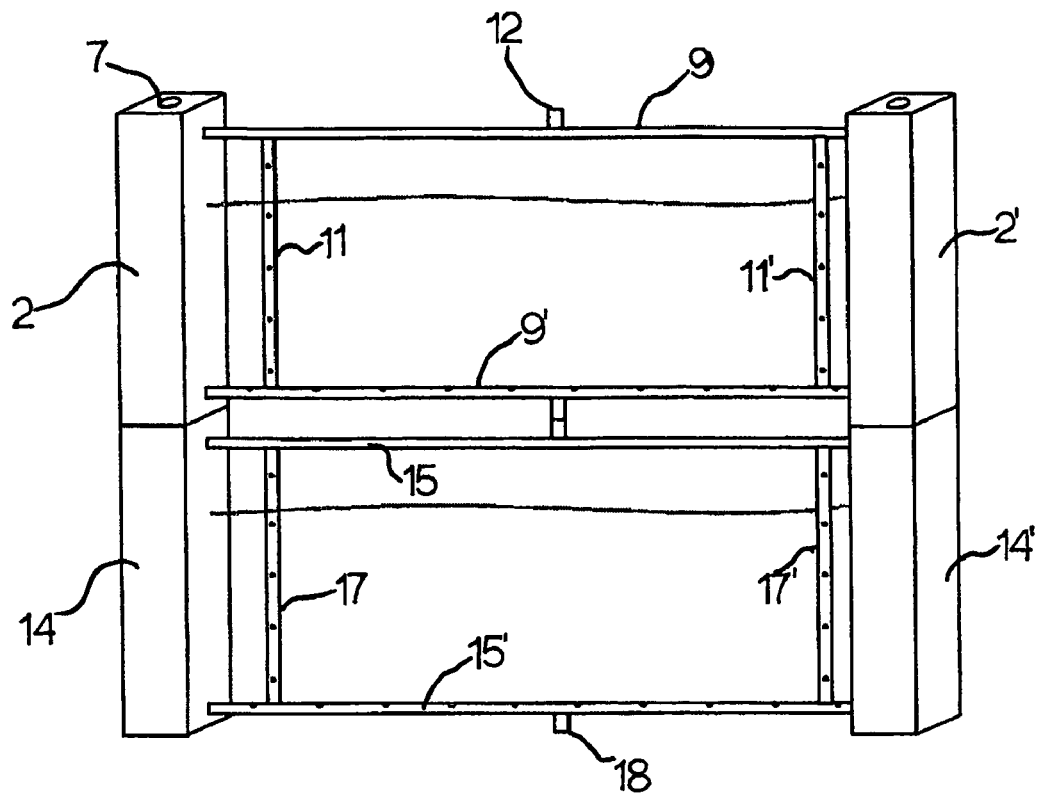
FIG. 5 is a perspective view showing two submerged hollow fiber module serially connected by a connecting member according to the present invention.

A structure in which hollow fiber membrane module units of the present invention are connected in plural numbers by a connecting member will be explained in detail with reference to FIG. 5 showing an embodiment in which two module units are combined.

FIG. 5 is a perspective view of two submerged hollow fiber membrane modules serially connected by a connecting member according to the present invention. In FIG. 5, only one string of hollow fiber membrane modules is illustrated for convenience.

Figure 6:
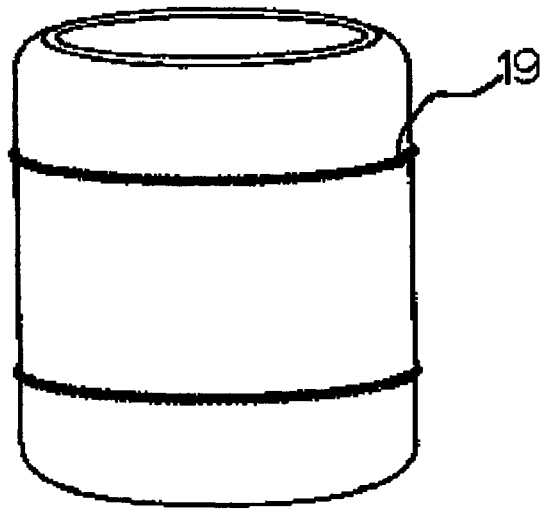
FIG. 6 is a perspective view of the connecting member.

The units of the hollow fiber membrane modules are connected vertically as shown in FIG. 5. The filtrate water outlets of the upper end surfaces of lower module heads 14 and 14' are connected and penetrated to the filtrate water outlets of the lower end surface of upper module headers 2 and 2', thereby allowing the spouting of filtrate water collected in a filtrate water collecting portion of the upper and lower module headers through the filtrate water outlets 7 of the upper module headers 2 and 2' connecting a filtrate water spouting apparatus such as a suction pump or the like. At this time, the filtrate water outlets of the lower end surfaces of the lower module headers 14 and 14' are preferably used by being closed by a closed connecting member like the embodiment of FIG. 4. Although FIG. 6 shows a connecting member for connecting and penetrating the upper and lower module headers by an O-ring 19, but the present invention is not limited thereto.

Regarding the connection of the air diffusion units, as shown in FIG. 5, the air injection port disposed on the upper support tube 15 of the air diffusion unit of the lower module is connected and penetrated to the air injection port disposed on the lower support tube 9' of the air diffusion unit of the upper module, thereby supplying air to the entire air diffusion units of the upper and lower modules through the air injection port of the upper support tube 9 of the air diffusion unit of the upper module connecting an air supply device. At this time, the air injection port disposed on the lower support tube 15' of the air diffusion unit of the lower module is preferably used b being closed by a closed connecting member like the embodiment of FIG. 4.

The connecting member to be used may include a connecting member of a screw or a clamp coupling type, but not limited thereto.

By the above-stated connecting method, a processing capacity of the module can be expanded without adding a projected installation area, thus it is possible to cope with a water treatment of various treatment scales.

A conventional submerged hollow fiber membrane module is problematic in that it is difficult to expand a module processing capability and manufacture a module, many water leakages occur due to the loosening of module connecting regions, the maintenance of flux is unstable in an air diffusion condition, and hollow fiber membranes are damaged.

The submerged module according to the present invention makes it easier to expand a module processing capability according to a treatment capacity, is excellent in durability owing to the minimization of module parts, makes it easier to carry out a job for manufacturing a module, and has such a structure capable of vibrating hollow fiber membranes as air is generated on three sides through an air diffusion unit, thereby effectively preventing fouling.

What is claimed is:

1. A submerged hollow fiber membrane module, comprising:
    first and second module headers, each of the module headers having a filtrate water collecting portion for collecting filtrate water filtered through hollow fiber membranes and a filtrate water outlet;
    an air diffusion unit between the first and second module headers, the air diffusion unit comprising support tubes and first and second air diffusion tubes having air diffusion holes; and
    a bundle of hollow fiber membranes having both opposite ends fixed to the insides of the module headers by an adhesive so as to form a water collecting space within the module headers, the ends of the hollow portions of the hollow fiber membranes being opened and disposed in parallel to a filtrate water discharge surface,
    wherein each of the support tubes has opposite ends connected to the two module headers respectively thereby keeping the two module headers spaced apart by a predetermined distance, and at least one of the support tubes has a plurality of air diffusion holes,
    wherein each of the first and second air diffusion tubes is connected to the support tubes near the first and second module headers, respectively, and disposed in the bundle of hollow fiber membranes,
    wherein the support tubes and the first and second air diffusion tubes are in fluid communication with one another, and
    wherein the first and second air diffusion tubes eject air in a first direction substantially parallel with a longitudinal direction of the hollow fiber membranes and at least one of the support tubes ejects air in a second direction substantially perpendicular to the longitudinal direction of the hollow fiber membranes.

2. The module of claim 1, wherein at least one of the support tubes has an air injection port.

3. The module of claim 1 or 2, wherein the distance between the module headers and the air diffusion tubes arranged adjacent thereto is 1 to 20 cm.

4. The module of claim 1 or 2, wherein the diameter of the air diffusion holes is 2 to 8 mm.

5. The module of claim 1 or 2, wherein the diameter of the air diffusion holes disposed on the air diffusion tubes is increased by 10 to 100% as compared to the air diffusion holes disposed right above as they go toward a lower part of the module.

6. The module of claim 2, wherein the diameter of the diffusion holes of a lower support tube is preferably 1.5 to 2.0 times larger than the diameter of smallest air diffusion holes of the air diffusion tubes.

7. The module of claim 1, wherein the tensile strength of a hollow fiber membrane constituting the bundle of hollow fiber membranes is 1 kg/strand or more.

8. The module of claim 1, wherein the hollow fiber membrane constituting the bundle of hollow fiber membranes is a composite hollow fiber membrane reinforced by braid and having a tensile strength greater than 10 kg/strand.

9. The module of claim 1, wherein the shape of the module headers is a cylindrical shape or a rectangular shape.

10. The module of claim 2, wherein the air injection port is provided with a first connecting member and the filtrate water outlet is provided with a second connecting member, such that two or more submerged hollow fiber membrane modules may be serially coupled.

11. The module of claim 10, wherein the first connecting member provides a path for flowing air between the serially coupled submerged hollow fiber membrane modules, and the second connecting member provides a path for flowing filtrate water between the serially coupled submerged hollow fiber membrane modules.

12. The module of claim 1, wherein the first and second module headers are vertically oriented.

13. The module of claim 1, wherein the first and second module headers are in fluid communication with the support tubes.

14. The module of claim 13, further comprising an air inlet in one of the support tubes.

* * * * *